United States Patent
Ueno et al.

(10) Patent No.: US 6,872,797 B2
(45) Date of Patent: Mar. 29, 2005

(54) COPOLYCARBONATE DIOL AND THERMOPLASTIC POLYURETHANE OBTAINED THEREFROM

(75) Inventors: Eizaburou Ueno, Kurashiki (JP); Tetsuo Masubuchi, Kawasaki (JP)

(73) Assignee: Asahi Kasei Kabushiki Kaisha, Osaka (JP)

( * ) Notice: Subject to any disclaimer, the term of this patent is extended or adjusted under 35 U.S.C. 154(b) by 0 days.

(21) Appl. No.: 10/469,297

(22) PCT Filed: Mar. 1, 2002

(86) PCT No.: PCT/JP02/01900
§ 371 (c)(1), (2), (4) Date: Aug. 29, 2003

(87) PCT Pub. No.: WO02/070584
PCT Pub. Date: Dec. 9, 2002

(65) Prior Publication Data
US 2004/0092699 A1 May 13, 2004

(30) Foreign Application Priority Data
Mar. 1, 2001 (JP) .......................................... 2001-56108

(51) Int. Cl.$^7$ .............................................. C08G 18/44
(52) U.S. Cl. ......................... 528/85; 568/852; 528/370; 252/182.2
(58) Field of Search ................... 528/85, 370; 568/852; 252/182.24

(56) References Cited

U.S. PATENT DOCUMENTS

| | | | |
|---|---|---|---|
| 4,129,715 A | 12/1978 | Chen et al. | |
| 4,362,825 A | 12/1982 | Grabhoefer et al. | |
| 4,980,385 A | * 12/1990 | Scarpati et al. | ............... 521/99 |

FOREIGN PATENT DOCUMENTS

| | | |
|---|---|---|
| EP | 0302712 A2 | 2/1989 |
| EP | 0343572 B1 | 11/1989 |
| EP | 0562577 B1 | 9/1993 |
| JP | 4-239023 A | 8/1992 |
| JP | 4-239024 A | 8/1992 |
| JP | 8-32777 B2 | 3/1996 |
| JP | 2506713 B2 | 4/1996 |
| JP | 10-292037 A | 11/1998 |
| JP | 3128275 B2 | 1/2001 |
| WO | 98/27133 A1 | 6/1998 |
| WO | 01/72867 A2 | 10/2001 |

* cited by examiner

*Primary Examiner*—Rachel Gorr
(74) *Attorney, Agent, or Firm*—Birch, Stewart, Kolasch & Birch, LLP

(57) ABSTRACT

A copolycarbonate diol comprising:
(a) recurring units each represented by the following formula (1):

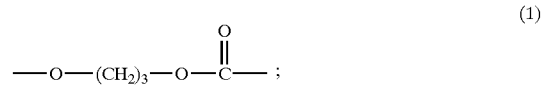

(b) recurring units each independently represented by the following formula (2):

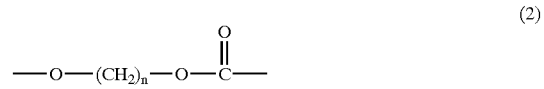

wherein n is 4, 5 or 6; and
(c) terminal hydroxyl groups, wherein the copolycarbonate diol has a number average molecular weight of from 300 to 20,000, and wherein the amount of the recurring units (a) is from 10 to 90% by mole, based on the total molar amount of the recurring units (a) and (b). A thermoplastic polyurethane obtained by copolymerizing the above-mentioned copolycarbonate diol with a polyisocyanate.

4 Claims, No Drawings

COPOLYCARBONATE DIOL AND THERMOPLASTIC POLYURETHANE OBTAINED THEREFROM

This application is the national phase under 35 U.S.C. §371 of PCT International Application No. PCT/JP02/01900 which has an International filing date of Mar. 1, 2002, which designated the United States of America.

BACKGROUND OF THE INVENTION

1. Field of the Invention

The present invention relates to a copolycarbonate diol. More particularly, the present invention is concerned with a copolycarbonate diol comprising:
(a) recurring units each represented by the following formula (1):

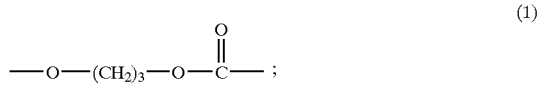

(b) recurring units each independently represented by the following formula (2):

wherein n is 4, 5 or 6; and
(c) terminal hydroxyl groups,
wherein the copolycarbonate diol has a number average molecular weight of from 300 to 20,000, and wherein the amount of the recurring units (a) is from 10 to 90% by mole, based on the total molar amount of the recurring units (a) and (b).

The copolycarbonate diol of the present invention is a liquid having low viscosity. Therefore, the copolycarbonate diol of the present invention is easy to handle, as compared to the conventional polycarbonate diols which are solids or highly viscous liquids. Hence, the copolycarbonate diol of the present invention is advantageous for various uses, such as a raw material for producing a thermoplastic elastomer (such as a thermoplastic polyurethane) used for producing various shaped articles (for example, a spandex, which is a polyurethane elastomeric fiber); a component for a coating material or an adhesive; and a polymeric plasticizer.

The present invention is also concerned with a thermoplastic polyurethane obtained from the above-mentioned copolycarbonate diol and a polyisocyanate. The thermoplastic polyurethane of the present invention exhibits excellent properties with respect to flexibility, heat resistance, low temperature properties, weathering resistance, strength, and molding processability. Therefore, the thermoplastic polyurethane of the present invention is extremely useful as a material for producing various shaped articles, such as automobile parts, parts for household electric appliances, toys and sundry goods. Especially, the thermoplastic polyurethane of the present invention is useful for producing shaped articles which are required to have high strength, such as hoses, sheets and industrial belts; and shaped articles which are required to have high flexibility, such as interior and exterior parts for automobiles (for example, window moles, bumpers, skin parts for an instrument panel, and grips), spandexes, bands for wristwatches, and shoe soles.

2. Prior Art

A polyurethane and a urethane-, ester- or amide-based thermoplastic elastomer are used in the art. The soft segments of the polyurethane and thermoplastic elastomer are composed of structural units formed from a polyester polyol and/or a polyether polyol, each of which has a hydroxyl group at each of the molecular terminals thereof (see, for example, U.S. Pat. Nos. 4,362,825 and 4,129,715). A polyester polyol, such as a polyadipate polyol, has poor hydrolysis resistance. Due to the poor hydrolysis resistance, for example, a polyurethane containing, as soft segments, structural units formed from a polyester polyol has a disadvantage in that tackiness and cracks are likely to occur on the surfaces of shaped articles of the polyurethane within a relatively short period of time. Therefore, the use of such a polyurethane is considerably limited. On the other hand, a polyurethane containing, as soft segments, structural units formed from a polyether polyol has good hydrolysis resistance and excellent flexibility. However, the polyurethane has a disadvantage in that it has poor resistance to light and oxidative degradation. The disadvantages of these polyurethanes are, respectively, attributed to the presence of ester groups in the polymer chain and the presence of ether groups in the polymer chain.

With respect to the polyester- or polyamide-based thermoplastic elastomer containing, as soft segments, structural units formed from a polyester polyol or a polyether polyol, there has recently been a demand for improvement in resistance to heat, light, hydrolysis and oil. In accordance with the increased demand for such improvement, the same disadvantages as accompanying the above-mentioned polyurethanes have been pointed out with respect also to the thermoplastic elastomer.

A polycarbonate polyol prepared from 1,6-hexanediol is used as a polyol usable for forming soft segments which have excellent resistance to hydrolysis, light, oxidative degradation, heat and the like. These resistances are due to the fact that carbonate linkages in the polymer chain exhibit extremely high chemical stability.

However, the polycarbonate polyol prepared from 1,6-hexanediol is crystalline and hence is a solid at room temperature. Therefore, for producing a polyurethane from the polycarbonate polyol and a polyisocyanate, it is necessary that the polycarbonate polyol be heated and melted before effecting a reaction with the polyisocyanate, so that a long period of time is required for producing a polyurethane. In this respect, the polycarbonate polyol poses a problem in handling.

As mentioned above, when this polycarbonate polyol is used for forming soft segments of a polyurethane, the polyurethane has improved resistance to hydrolysis, light, oxidative degradation and heat. However, the polyurethane has defects in flexibility and low temperature properties. Especially, the polyurethane is defective in that it exhibits markedly poor elastic recovery at low temperatures. Due to such defects, the polyurethane poses a problem in that it exhibits poor stringiness and hence has poor spinnability. The reason for the poor stringiness is that crystallization is likely to occur in the soft segments of the polyurethane, thus leading to a lowering of the elasticity of the polyurethane. Such easy occurrence of crystallization in the soft segments results from the high crystallinity of the polycarbonate polyol prepared from 1,6-hexanediol.

In order to solve these problems, it has been proposed to copolymerize 1,6-hexanediol with a polyhydric alcohol having a side chain so as to produce a copolycarbonate polyol. For example, in Unexamined Japanese Patent Application Laid-Open Specification No. Hei 10-292037, a polycarbonate containing recurring units derived from 1,6-hexanediol and neopentyl glycol, is disclosed. This polycarbonate is used as a material for a polyurethane, a polyamide elastomer and a polyester elastomer, and as a component for a coating material and an adhesive.

In Japanese Patent No. 2781104 (corresponding to EP 562 577), a polycarbonate polyol containing recurring units derived from a diol having a branched structure and a polyhydric alcohol comprising a tetrahydric to hexahydric alcohol, is disclosed. This polycarbonate polyol is used as a binder for a coating material.

In Unexamined Japanese Patent Application Laid-Open Specification No. Hei 2-49025 (corresponding to EP 343 572), a polycarbonate diol containing recurring units derived from a $C_3$–$C_{20}$ polyhydric alcohol having a side chain and 1,6-hexanediol, is disclosed. This polycarbonate diol is used as a material for producing a polyurethane.

In Japanese Patent No. 2506713, a polycarbonate diol containing recurring units derived from 2-methyl-1,8-octanediol or recurring units derived from a diol comprised mainly of 2-methyl-1,8-octanediol and 1,9-nonanediol, is disclosed. This polycarbonate diol is used as a material for producing a polyurethane, a polyamide elastomer and a polyester elastomer, and is used in the fields of a coating material and an adhesive.

WO 98/27133 discloses a polycarbonate polyol containing recurring units derived from a diol having a side chain which contains two lower alkyl groups, and a polyurethane produced using, as a soft segment, this polycarbonate polyol.

These polycarbonate polyols have a side chain, and, therefore, the elastomers (such as polyurethanes) produced using, as a soft segment, these polycarbonate polyols, have a side chain, i.e., they have a branched structure. Due to such branched structure, the polycarbonate polyols have a problem in that the elastomers produced using these polycarbonate polyols exhibit poor mechanical properties, as compared to those of elastomers which have no side chains.

When a thermoplastic elastomer is produced using, as a soft segment, a polycarbonate polyol prepared from a bulky polyhydric alcohol (e.g., neopentyl glycol) which contains a quaternary carbon atom having two side chains bonded thereto, the strength of the thermoplastic elastomer is lowered depending on the content of the recurring units derived from the above-mentioned bulky polyhydric alcohol.

When a thermoplastic elastomer is produced using, as a soft segment, a polycarbonate polyol prepared from a polyhydric alcohol which contains a tertiary carbon atom having one side chain bonded thereto, there is a problem in that the heat aging resistance of the thermoplastic elastomer is lowered. The reason for occurrence of such a low heat aging resistance of the thermoplastic elastomer is that the hydrogen atom which is bonded to the tertiary carbon atom having one side chain is likely to become a radical so as to be easily eliminated from the tertiary carbon atom, as compared to a hydrogen atom which is bonded to a secondary carbon atom having no side chains.

As another measure for lowering the crystallinity of a polycarbonate polyol prepared from 1,6-hexanediol, it has been proposed that 1,6-hexanediol is copolymerized with a diol having no side chains so as to produce a copolycarbonate diol.

For example, Examined Japanese Patent Application Publication No. Hei 5-29648 (corresponding to EP 302 712 and U.S. Pat. Nos. 4,855,377 and 5,070,173) discloses an aliphatic copolycarbonate diol produced using 1,5-pentanediol and 1,6-hexanediol.

Generally, even when a homopolymer which is obtained by homopolymerizing a monomer is crystalline, a copolymer which is obtained by copolymerizing the monomer with an appropriate comonomer has low crystallinity, as compared with the homopolymer; the reason for this is that the structural regularity of the copolymer is disordered by the comonomer units. In the case of a copolycarbonate polyol containing 1,6-hexanediol units, when the comonomer diol units are, for example, those derived from a diol which contains an odd number of methylene groups, such as 1,5-pentanediol, the structural regularity of the copolycarbonate polyol is likely to be greatly disordered, as compared to the case where the comonomer diol units are those derived from a diol which contains an even number of methylene groups.

However, this copolycarbonate diol is a solid or a viscous liquid, so that the handling properties of the copolycarbonate diol are unsatisfactory, depending on the use thereof.

In recent years, a thermoplastic polyurethane which is produced using, as a soft segment, a copolycarbonate diol prepared from a mixture of 1,6-hexanediol and 1,4-butanediol or 1,5-pentanediol is attracting attention because of its great advantages. (The above-mentioned copolycarbonate diol is disclosed in Examined Japanese Patent Application Publication No. Hei 5-029648 (which is mentioned above) and Japanese Patent No. 3128275; and the above-mentioned thermoplastic polyurethane is disclosed in Unexamined Japanese Patent Application Laid-Open Specification No. Hei 5-51428 and Japanese Patent No. 1985394 (corresponding to EP 302 712 and U.S. Pat. Nos. 4,855,377 and 5,070,173).) Specifically, such thermoplastic polyurethane has advantages in that it has remarkably excellent properties with respect to flexibility and low temperature properties, as well as the same excellent properties as mentioned above and as achieved by using, as a soft segment, a polycarbonate diol prepared from 1,6-hexanediol, i.e., excellent resistance to hydrolysis, light, oxidative degradation and heat.

However, in the course of the studies of the present inventors, it was found that the thermoplastic polyurethane produced using, as a soft segment, the above-mentioned copolycarbonate diol has a problem in that the flexibility is still unsatisfactory and hence the use of the thermoplastic polyurethane is limited.

With respect to polycarbonate diols other than those mentioned above, there are documents which refer to the use of a polycarbonate diol prepared from 1,3-propanediol.

For example, in WO 01/72867, there is disclosed a thermoplastic polyurethane produced using, as a soft segment, a polycarbonate diol in which the diol units are composed only of 1,3-propanediol units. However, this thermoplastic polyurethane is hard and exhibits high modulus (that is, the elongation of the thermoplastic polyurethane is unsatisfactory), rendering it difficult to use the thermoplastic polyurethane in the same application fields as those of the ordinary elastomers. The reason for this has not yet been completely elucidated; however, the reason is presumed to be as follows.

In the above-mentioned polycarbonate diol, each recurring unit has only three methylene groups (derived from 1,3-propanediol), so that the ratio of the carbonate linkages in the polycarbonate diol molecule is high. The flexibility of such polycarbonate diol molecule is lowered, and hence, the thermoplastic polyurethane produced using such polycarbonate diol exhibits low elasticity.

Examined Japanese Patent Application Publication No. Hei 8-32777 discloses a process for rapidly producing a polycarbonate diol, comprising subjecting a mixture of a dialkyl carbonate and a hydroxy compound or a mixture of a diaryl carbonate and a hydroxy compound to a transesterification reaction in the presence of a titanium compound or a tin compound. This process is intended to rapidly produce a high quality polycarbonate diol which is less likely to suffer discoloration.

In this prior art document, as examples of hydroxy compounds, 1,3-propanediol, 1,4-butanediol, 1,5-pentanediol and 1,6-hexanediol are described. However, in this prior art document, no polycarbonate diol is actually produced using 1,3-propanediol. Further, no polyurethane is produced using a polycarbonate diol, and no evaluation is made with respect to the properties of a polyurethane.

Unexamined Japanese Patent Application Laid-Open Specification No. Hei 4-239024 discloses the following process. First, a reaction mixture which contains a low molecular weight polycarbonate diol is produced. A diaryl carbonate is added to the reaction mixture produced, and a reaction is performed while removing a by-produced alcohol, thereby producing a high molecular weight polycarbonate diol. This process is intended to produce a polycarbonate diol using a monomer in a small amount.

In this prior art document, as examples of diols which are usable as a material for producing the polycarbonate diol, 1,3-propanediol, 1,4-butanediol, 1,5-pentanediol and 1,6-hexanediol are described. However, in this prior art document, no polycarbonate diol is produced using 1,3-propanediol. Further, no polyurethane is produced using a polycarbonate diol, and naturally, any evaluation is not made with respect to the properties of a polyurethane.

As apparent from the foregoing, conventionally, there has not yet been obtained a polycarbonate diol which is suitable as a material for producing a thermoplastic polyurethane which is advantageous not only in that it exhibits excellent resistance to hydrolysis, light, oxidative degradation and heat, but also in that it exhibits excellent properties with respect to flexibility and low temperature properties.

SUMMARY OF THE INVENTION

In this situation, the present inventors have made extensive and intensive studies with a view toward developing a thermoplastic polyurethane which is advantageous not only in that it exhibits excellent resistance to hydrolysis, light, oxidative degradation and heat, but also in that it exhibits excellent flexibility comparable to that of a polyether-based thermoplastic polyurethane, and exhibits excellent low temperature properties, especially excellent elastic recovery at low temperatures, and with a view toward developing a polycarbonate diol which is suitable as a material for producing the thermoplastic polyurethane and which is easy to handle. As a result of these studies, it has unexpectedly been found that a copolycarbonate diol which is obtained by copolymerizing at least one diol selected from the group consisting of 1,4-butanediol, 1,5-pentanediol and 1,6-hexanediol with 1,3-propanediol, is advantageous not only in that it exhibits excellent handling properties, but also in that a thermoplastic polyurethane which is obtained by copolymerizing this copolycarbonate diol with a polyisocyanate exhibits excellent properties with respect to flexibility and low temperature properties, as well as excellent resistance to hydrolysis, light, oxidative degradation and heat.

The above-mentioned copolycarbonate diol comprises
(a) recurring units each represented by the following formula (1):

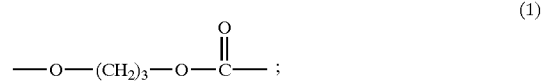

(b) recurring units each independently represented by the following formula (2):

wherein n is 4, 5 or 6; and
(c) terminal hydroxyl groups.

The present invention has been completed on the basis of these novel findings.

Accordingly, it is an object of the present invention to provide a copolycarbonate diol which exhibits excellent handling properties and is suitable as a material for producing a thermoplastic polyurethane which exhibits excellent properties with respect to flexibility and low temperature properties, as well as excellent resistance to hydrolysis, light, oxidative degradation and heat.

It is another object of the present invention to provide a thermoplastic polyurethane exhibiting excellent properties, which is obtained by copolymerizing the above-mentioned copolycarbonate diol with a polyisocyanate.

The foregoing and other objects, features and advantages of the present invention will be apparent to those skilled in the art from the following detailed description and appended claims.

DETAILED DESCRIPTION OF THE INVENTION

According to the present invention, there is provided a copolycarbonate diol comprising:
(a) recurring units each represented by the following formula (1):

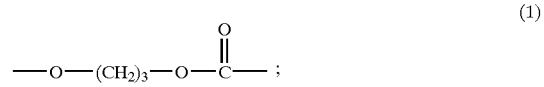

(b) recurring units each independently represented by the following formula (2):

wherein n is 4, 5 or 6; and
(c) terminal hydroxyl groups,
wherein the copolycarbonate diol has a number average molecular weight of from 300 to 20,000, and wherein the amount of the recurring units (a) is from 10 to 90% by mole, based on the total molar amount of the recurring units (a) and (b).

For easy understanding of the present invention, the essential features and various preferred embodiments of the present invention are enumerated below.

1. A copolycarbonate diol comprising:
(a) recurring units each represented by the following formula (1):

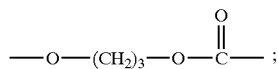
(1)

(b) recurring units each independently represented by the following formula (2):

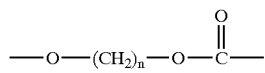
(2)

wherein n is 4, 5 or 6; and
(c) terminal hydroxyl groups,
wherein the copolycarbonate diol has a number average molecular weight of from 300 to 20,000, and wherein the amount of the recurring units (a) is from 10 to 90% by mole, based on the total molar amount of the recurring units (a) and (b).

2. The copolycarbonate diol according to item 1 above, which has a number average molecular weight of from 500 to 10,000.

3. The copolycarbonate diol according to item 1 or 2 above, wherein the amount of the recurring units (a) is from 20 to 80% by mole, based on the total molar amount of the recurring units (a) and (b).

4. A thermoplastic polyurethane obtained by copolymerizing the copolycarbonate diol of any one of items 1 to 3 above with a polyisocyanate.

Hereinbelow, the present invention will be described in detail.

The copolycarbonate diol of the present invention comprises:
(a) recurring units each represented by the following formula (1):

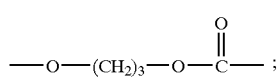
(1)

(b) recurring units each independently represented by the following formula (2):

(2)

wherein n is 4, 5 or 6; and
(c) terminal hydroxyl groups.

Due to such structure, the structural regularity of the copolycarbonate diol of the present invention is low, as compared to that of a polycarbonate diol which is a homopolymer.

The recurring unit (a) contains only three methylene groups, i.e., a small odd number of methylene groups. A recurring unit containing a small odd number of methylene groups tends to be more effective for disordering the structural regularity of a copolycarbonate diol than other recurring units. Therefore, by virtue of the use of the recurring unit (a), the crystallinity of the copolycarbonate diol is lowered, so that the copolycarbonate diol is an amorphous polymer such that a crystallization temperature and a melting temperature are not observed in analyses by differential scanning calorimetry (DSC). As a result, the viscosity of the copolycarbonate diol is lowered and the copolycarbonate diol is easy to handle. In addition, a thermoplastic polyurethane obtained using the copolycarbonate diol exhibits improved flexibility. Further, a thermoplastic elastomer (especially a thermoplastic polyurethane) produced using the amorphous copolycarbonate diol exhibits excellent stringiness.

In the copolycarbonate diol of the present invention, the amount of the recurring units (a) is from 10 to 90% by mole, preferably from 20 to 80% by mole, more preferably from 30 to 70% by mole, based on the total molar amount of the recurring units (a) and (b).

Such copolycarbonate diol is generally a viscous liquid at room temperature, but the viscosity of the copolycarbonate diol is lower than those of the conventional polycarbonate diols. Therefore, when the copolycarbonate diol of the present invention is used as a material for producing a thermoplastic elastomer (such as a thermoplastic polyurethane) or as a component for a coating material or an adhesive, the copolycarbonate diol is easy to handle.

It is especially preferred that a thermoplastic polyurethane is produced using a copolycarbonate diol of the present invention wherein the amount of the recurring units (a) is from 30 to 70% by mole, based on the total molar amount of the recurring units (a) and (b). A thermoplastic polyurethane produced using such copolycarbonate diol exhibits excellent properties with respect not only to flexibility and modulus (that is, the modulus is low), but also to elongation and impact resilience. That is, such thermoplastic polyurethane exhibits extremely advantageous properties which are similar to those of a vulcanized rubber.

The number average molecular weight of the copolycarbonate diol of the present invention is from 300 to 20,000, preferably from 500 to 10,000, more preferably from 800 to 3,000.

When the number average molecular weight of the copolycarbonate diol is less than 300, the flexibility and low temperature properties of the thermoplastic polyurethane produced using the copolycarbonate diol tends to be unsatisfactory. On the other hand, when the number average molecular weight of the copolycarbonate diol is more than 20,000, the molding processability of the thermoplastic polyurethane produced using the copolycarbonate diol is lowered.

In the present invention, the number average molecular weight of the copolycarbonate diol is determined from the hydroxyl value of the copolycarbonate diol, by the following method. More specifically stated, first, the hydroxyl (OH) value of the copolycarbonate diol is determined by the neutralization titration method (JIS K 0070-1992), which uses acetic anhydrate, pyridine and an ethanol solution of potassium hydroxide. The number average molecular weight (Mn) is calculated from the OH value in accordance with the following formula:

$$Mn = 56.1 \times 2 \times 1{,}000 \div OH\ value$$

It is preferred that substantially all terminal groups of the copolycarbonate diol of the present invention are hydroxyl groups. The terminal groups of the copolycarbonate diol can be determined by measuring the acid value of the copolycarbonate diol or analyzing the copolycarbonate diol by $^{13}C$-NMR ($^{13}C$-nuclear magnetic resonance) spectroscopy. The acid value of a substance is the amount (mg) of potassium hydroxide (KOH) required for neutralizing the acidic groups in 1 g of the substance. When the acid value of the copolycarbonate diol is 0.01 or less, the copolycarbonate diol contains substantially no acid groups and, therefore, it is confirmed that substantially all terminal groups of the copolycarbonate diol are hydroxyl groups.

Hereinbelow, an explanation is made with respect to the process for producing the copolycarbonate diol of the present invention.

The copolycarbonate diol of the present invention can be obtained by subjecting to a polymerization reaction the following components:

(I) 1,3-propanediol;
(II) at least one diol selected from the group consisting of 1,4-butanediol, 1,5-pentanediol and 1,6-hexanediol; and
(III) a carbonate compound.

The amount of 1,3-propanediol (hereinafter, frequently referred to as the "diol (I)") is from 10 to 90% by mole, preferably from 20 to 80% by mole, more preferably from 30 to 70% by mole, based on the total molar amount of the diols (I) and (II).

Examples of carbonate compounds (III) above include dialkyl carbonates, such as dimethyl carbonate, diethyl carbonate and dibutyl carbonate; alkylene carbonates, such as ethylene carbonate, 1,2-propylene carbonate and trimethylene carbonate; and diaryl carbonates, such as diphenyl carbonate. Among these, alkylene carbonates are preferred, since when alkylene carbonates are used for producing the copolycarbonate diol of the present invention, a copolycarbonate diol in which substantially all terminal groups are hydroxyl groups can be easily obtained. Such copolycarbonate diol is especially advantageous as a material for producing a thermoplastic polyurethane.

Among alkylene carbonates, ethylene carbonate is preferred, since the use of ethylene carbonate provides the following advantage.

In the above-mentioned polymerization reaction, there is by-produced a compound containing a hydroxyl group, which is derived from the carbonate compound (III) (hereinafter, this by-product is referred to as a "hydroxyl group-containing by-product"). When ethylene-carbonate is used as the carbonate compound (III), the hydroxyl group-containing by-product is ethylene glycol. Ethylene glycol has a relatively low boiling point and hence can be easily removed from the reaction system.

With respect to the amount of the carbonate compound (III), there is no particular limitation. However, in general, the molar ratio of the carbonate compound (III) to the total molar amount of the diols (I) and (II) is from 20:1 to 1:20.

It is preferred that the copolycarbonate diol of the present invention is produced using only the above-mentioned components (I) to (III). The reason for this preference is that there can be obtained advantages in that the polymerization reaction is almost not limited by the melting points and boiling points of the diols (I) and (II), and that a thermoplastic polyurethane produced using the obtained copolycarbonate diol exhibits especially improved flexibility. However, if desired, a polyhydric alcohol other than the diols (I) and (II) can be used in combination with the diols (I) and (II) as long as the effects of the present invention are not adversely affected.

Examples of polyhydric alcohols include linear diols, such as 1,7-heptanediol, 1,8-octanediol, 1,9-nonanediol, 1,10-decanediol, 1,11-undecanediol and 1,12-dodecanediol; branched diols, such as neopentyl glycol, 3-methylpentane-1,5-diol, 2-ethyl-1,6-hexanediol, 2-methyl-1,3-propanediol and 2-methyl-1,8-octanediol; cyclic diols, such as 1,3-cyclohexanediol, 1,4-cyclohexanediol, 2,2-bis(4-hydroxycyclohexyl)-propane and 1,4-cyclohexanedimethanol; and alcohols containing three or more hydroxyl groups, such as trimethy-lolethane, trimethylolpropane, hexanetriol and pentaerythritol.

The suitable amount of the polyhydric alcohol varies depending on the type of the polyhydric alcohol.

When a linear diol is used as the polyhydric alcohol, the amount of the linear diol is generally 20% by mole or less, preferably 10% by mole or less, based on the total molar amount of the diols (I) and (II).

When a branched diol and/or a cyclic diol is used as the polyhydric alcohol, it is preferred that the amount of the polyhydric alcohol is less than in the case where a linear diol is used as the polyhydric alcohol. Specifically, the amount of a branched diol and/or a cyclic diol is generally 15% by mole or less, preferably 5% by mole or less, based on the total molar amount of the diols (I) and (II).

The reason why, when a branched diol and/or a cyclic diol is used as the polyhydric alcohol, it is preferred that the amount of the polyhydric alcohol is less than in the case where a linear diol is used as the polyhydric alcohol, is as follows. When a branched diol and/or a cyclic diol is used for producing a copolycarbonate diol, the strength and heat aging resistance of a thermoplastic polyurethane produced using the copolycarbonate diol tend to be lower than those of a thermoplastic polyurethane produced using a copolycarbonate diol produced by a process using a linear diol as the polyhydric alcohol.

When an alcohol containing three or more hydroxyl groups is used as the polyhydric alcohol, a reaction product obtained by the polymerization reaction performed for producing the copolycarbonate diol of the present invention, is a copolycarbonate polyol containing three or more hydroxyl groups. In the present invention, such copolycarbonate polyol is also regarded as the copolycarbonate diol of the present invention.

In the case where an alcohol containing three or more hydroxyl groups is used as the polyhydric alcohol, the amount of the polyhydric alcohol is generally 10% by mole or less, preferably 5% by mole or less, based on the total molar amount of the diols (I) and (II). When the amount of the polyhydric alcohol is too large, too large an amount of crosslinkages are introduced into a polyurethane produced using the copolycarbonate diol, thus leading to a lowering of the thermoplasticity of the polyurethane.

With respect to the method for performing the polymerization reaction, there is no particular limitation, and the polymerization reaction can be performed by using conventional methods, such as the various methods described in "Polymer Reviews", Vol. 9, pp. 9–20, written by H. Schnell (published by Interscience Publishers, U.S.A., 1964), and the method described in the above-mentioned Examined Japanese Patent Application Publication No. Hei 5-29648.

Hereinbelow, an explanation is made of an example of a method for producing the copolycarbonate diol of the present invention, which comprises the following two steps:

(1) performing a polymerization reaction of the above-mentioned raw materials (I) to (III) and optionally the polyhydric alcohol, while removing the hydroxyl group-containing by-product from the reaction system, to thereby obtain a copolycarbonate prepolymer; and (2) performing a self-condensation of the above-obtained copolycarbonate prepolymer, to thereby obtain the copolycarbonate diol of the present invention.

First, an explanation is made of the step (1).

In the step (1), the diol (I) (1,3-propanediol), the diol (II) (at least one diol selected from the group consisting of 1,4-butanediol, 1,5-pentanediol and 1,6-hexanediol), the carbonate compound (III) and optionally the polyhydric alcohol are mixed together, and the resultant mixture is subjected to a polymerization reaction, to thereby obtain a copolycarbonate prepolymer.

Hereinbelow, an explanation is made taking as an example the case where only the diols (I) and (II) and the carbonate compound (III) are used as the raw materials. With respect to the case where the polyhydric alcohol is used as an optional raw material, the polyhydric alcohol is considered to show substantially the same behavior as that of the diol (II), in the polymerization reaction.

The main reactions involved in the polymerization reaction are the addition reaction, namely, the reaction of addition of the diol (I) or (II) to the carbonate compound (III), and the transesterification reaction between the reaction product of the addition reaction and the diol (I) or (II). As the transesterification reaction proceeds, the hydroxyl group-containing by-product is eliminated from the carbonate compound (III). Since the transesterification reaction is an equilibrium reaction, when the hydroxyl group-containing by-product accumulates in the reaction system, the polymerization does not satisfactorily advance. Therefore, it is preferred that the polymerization reaction is performed while removing the hydroxyl group-containing by-product from the reaction system.

More specifically, it is preferred that the polymerization reaction of the step (1) is performed in the following manner: a vapor containing the hydroxyl group-containing by-product which is produced during the polymerization reaction, is generated, and the thus generated vapor is condensed to obtain a condensate, and at least a part of the thus obtained condensate is removed from the reaction system. For facilitating the generation of the vapor, it is preferred that the polymerization reaction is performed under reduced pressure.

In this instance, for increasing the efficiency of the removal of the hydroxyl group-containing by-product, a method may be adopted in which an inert gas (such as nitrogen, argon, helium, carbon dioxide and a lower hydrocarbon gas) which does not have an adverse effect on the polymerization reaction, is introduced into the reaction system so that the hydroxyl group-containing by-product is removed in a form entrained by the inert gas.

For suppressing the distillation of the diols (I), (II) and the carbonate compound (III), and for efficiently removing the hydroxyl group-containing by-product from the reaction system, it is preferred that the polymerization reaction is performed in a reactor equipped with a fractionating column. When using a fractionating column, the separating capability thereof is important. Hence, a fractionating column is used which generally has a number of theoretical plates of 5 or more, preferably 7 or more.

A fractionating column is used generally in such a form as equipped, at its top, with an appropriate reflux condenser. The reflux condenser is used for condensing the vapor ascending inside of the fractionating column, to form a condensate, and for causing at least a part of the condensate to flow down inside of the fractionating column, back to the reactor. Use of such a fractionating column is advantageous in that the vapor containing the hydroxyl group-containing by-product (which ascends inside of the fractionating column) and the condensate (which flows down inside of the fractionating column) contact each other in a counter flow, thereby causing the hydroxyl group-containing by-product in the condensate to move into the vapor, and also causing the diols (I) and (II) and the carbonate compound (III) in the vapor to move into the condensate, to thereby facilitate the efficient removal of the hydroxyl group-containing by-product from the reaction system.

In the process for producing the copolycarbonate diol of the present invention, it is preferred that the polymerization reaction is performed by using the reactor as mentioned above, while generating a vapor containing the hydroxyl group-containing by-product, and the generated vapor is condensed into a condensate by means of a reflux condenser, followed by removal of a part of the obtained condensate as a distillate from the reaction system while causing the remainder of the condensate to flow down inside of the fractioning column, back to the reactor.

By setting in an appropriate range the volume ratio of the condensate returned to the reaction vessel, relative to the condensate removed as a distillate from the reaction system (i.e., the reflux ratio), advantages can be obtained in that the distillation of the diols (I), (II) and the carbonate compound (III) can be suppressed, thereby increasing the efficiency of the reaction. With respect to the appropriate range of reflux ratio, although it varies depending on the performance of the fractionating column, the reflux ratio is generally in the range of from 3 to 10, preferably from 3 to 7.

In addition, for efficiently performing the polymerization reaction, it is important to appropriately control the amount of the vapor (containing the hydroxyl group-containing by-product) which ascends inside of the fractionating column per unit time (i.e., it is important to appropriately control the so-called "throughput"). When the throughput is too small, the rate of removal of the hydroxyl group-containing by-product becomes low and hence the reaction time becomes long. On the other hand, when the throughput is too large, the efficiency of the reaction is decreased, due to, e.g., the distillation of the diols (I) and (II). Therefore, it is preferred that the throughput is as great as possible, as long as the efficiency of the reaction is not decreased.

The control of the reflux ratio and throughput is performed by appropriately controlling the temperature and pressure for the reaction. The appropriate control of the reflux ratio and throughput is extremely advantageous in that the polymerization reaction can be completed in a relatively short time, thereby improving not only the productivity of the copolycarbonate diol but also the quality thereof.

The reaction temperature in the step (1) is generally in the range of from 125 to 160° C., preferably from 130 to 150° C.

When the reaction temperature is lower than 125° C., the rate of the transesterification reaction becomes low and hence the reaction time becomes long.

On the other hand, when the reaction temperature is higher than 160° C., the diol (I) (1,3-propanediol) bonded to the terminals of the copolycarbonate prepolymer is likely to get easily eliminated as a trimethylene carbonate, thus rendering it difficult to satisfactorily increase the molecular weight of the obtained copolycarbonate prepolymer.

Further, when the reaction temperature is higher than 160° C., the following disadvantage also occurs. In the case where ethylene carbonate is used as the carbonate compound (III), when the reaction temperature is higher than 160° C., the ethylene carbonate undergoes a decarboxylation, thus converting the ethylene carbonate into an ethylene oxide. The formed ethylene oxide reacts with the terminal hydroxyl groups of the diol (I) or (II), thus producing a diol containing an ether linkage. The formed ether linkage-containing diol gets polymerized in substantially the same manner as the diols (I) and (II), thus producing a copolycarbonate prepolymer containing an ether linkage. When this prepolymer is subjected to the step (2) described below, a copolycarbonate diol containing an ether linkage is obtained. A thermoplastic polyurethane obtained using such copolycarbonate diol exhibits poor resistance to heat and light.

In addition, in the case where 1,4-butanediol or 1,5-pentanediol is used as the diol (II), when the reaction temperature is higher than 160° C., there is a disadvantage in that a product formed by the reaction between the diol (II) and ethylene carbonate, and/or the diol (II) bonded to the terminals of the copolycarbonate prepolymer produced in the reaction is likely to be easily eliminated as a cyclic ether (namely, a tetrahydrofuran and/or a tetrahydropyran).

With respect to the pressure for the reaction, it is generally in the range of from atmospheric pressure to 0.5 kPa; however, due to the reason as mentioned above, it is preferred that the reaction is performed under reduced pressure.

With respect to the timing of the termination of the polymerization reaction, there is no particular limitation; however, when the polymerization reaction is terminated at an early stage of reaction where the conversion of diol (as described below) is still low, there is a disadvantage in that not only does the yield of the obtained copolycarbonate prepolymer become low, but also the reaction time of the step (2) as described below becomes long.

On the other hand, when the polymerization reaction is performed so as to achieve a very high conversion of diol, there is a problem in that, as the reaction proceeds, the diols (I) and (II) and the carbonate compound (III) contained in the reaction mixture in the reactor are consumed and hence the concentrations of the diols (I) and (II) and the carbonate compound (III) in the reaction mixture become low, thus decreasing the polymerization rate. As a result, an extremely long period of time is required for achieving a very high conversion of diol.

Therefore, it is generally preferred that the polymerization reaction in the step (1) is terminated when the conversion of diol has reached 50 to 95%. The conversion of diol is represented by the following formula:

$$\text{Conversion of diol } (\%) = \{1 - (A/B)\} \times 100$$

wherein:
A is the total molar amount of diols (I) and (II) contained in the reaction mixture; and
B is the total molar amount of diols (I) and (II) charged into the reactor.

The value of A as mentioned above is obtained by a method in which the reaction mixture obtained in the step (1) is subjected to gas chromatography (GC) analysis so as to determine the amounts (in mole) of 1,3-propanediol, 1,4-butanediol, 1,5-pentanediol and 1,6-hexanediol, and the value of A is calculated from the determined amounts of these diols. If desired, before being subjected to the GC analysis, the reaction mixture may be appropriately diluted with an organic solvent, such as acetone and the like.

The conditions for the GC analysis are as follows.
Apparatus: GC-14B (manufactured and sold by Shimadzu Corporation, Japan)
Column: DB-WAX (manufactured and sold by J & W, U.S.A.)
(column length: 30 m, film thickness: 0.25 µm)
Detector: FID (flame ionization detector)
Internal standard: diethylene glycol diethyl ether
Temperature: the temperature was first maintained at 60° C. for 5 minutes and then elevated to 250° C. at a rate of 10° C./min.

The copolycarbonate prepolymer obtained in the step (1) generally exhibits a degree of polymerization in the range of from 2 to 10. Generally, the degree of polymerization of the copolycarbonate prepolymer is controlled by adjusting the amount of the hydroxyl group-containing by-product removed from the reaction system.

Hereinbelow, an explanation is made of the step (2) of the process for producing the copolycarbonate diol of the present invention.

In the step (2), the copolycarbonate prepolymer obtained in the step (1) is subjected to a self-condensation reaction, thereby producing the copolycarbonate diol of the present invention. Since this self-condensation reaction is a transesterification, as the reaction proceeds, the diols (I) and (II) are eliminated from the terminals of the copolycarbonate diol being produced. Since the transesterification reaction is an equilibrium reaction, when the diols (I) and (II) accumulate in the reaction system, the polymerization does not satisfactorily advance. Therefore, it is preferred that the polymerization reaction is performed while removing the eliminated diols (I) and (II) from the reaction system.

Generally, the removal of the eliminated diols (I) and (II) from the reaction system is performed by evaporation and hence, in the step (2), the polymerization reaction is generally performed under reduced pressure.

Specifically, the step (2) is generally performed as follows.

The contents (reaction mixture) of the reactor are heated under reduced pressure to effect a self-condensation reaction while removing to the outside of the reaction system a vapor being generated which is comprised mainly of the eliminated diols (I) and (II). Differing from the case of the step (1), in the step (2), for efficiently removing the diols (I) and (II) as they are eliminated from the copolycarbonate diol being produced, it is preferred that the vapor comprised mainly of the eliminated diols (I) and (II) is directly removed from the reaction system to the outside, without using a fractionating column or the like. In addition, it is preferred that, by using a thin film evaporator, the reaction mixture obtained in the step (1) is caused to flow down in the form of a thin film in the evaporator, thereby evaporating off the eliminated diols (I) and (II) while performing the reaction in the step (2).

In the step (2), generally, the reaction mixture obtained in the step (1), as such, namely without being purified, is subjected to a self-condensation reaction. The reaction mixture may contain unreacted diols (I) and (II) or unreacted carbonate compound (III); however, these unreacted substances are removed either in the depressurization operation immediately upon initiation of the reaction in the step (2) or at the early stage of the reaction in the step (2).

In the step (2), the reaction temperature is generally in the range of from 125 to 170° C., preferably from 130 to 150° C.

The diols (I) and (II) and the carbonate compound (III) used as the raw materials in the step (1), may cause a side reaction under high temperature conditions, thus forming an ether compound which deteriorates the properties of the thermoplastic polyurethane produced using the obtained copolycarbonate diol. In the step (2), however, the reaction is performed under conditions wherein the diols (I) and (II) and the carbonate compound (III) are present only in small amounts in the reaction system; in addition, as the reaction proceeds, the amounts of the diols (I), (II) and the carbonate compound (III) become substantially zero. Hence, an ether compound is formed only in a very small amount in the step (2). Therefore, in the step (2), the reaction temperature can be higher than in the step (1).

However, when the reaction temperature is higher than 170° C., the decomposition (i.e., depolymerization) of the obtained copolycarbonate diol is likely to occur, leading to a problem in that a copolycarbonate diol having the desired composition and molecular weight cannot be obtained.

On the other hand, when the reaction temperature is lower than 125° C., the reaction rate is low and hence the reaction time becomes long.

With respect to the pressure (namely, the degree of vacuum) for the reaction in the step (2), it is generally in the range of from 0.10 to 10 kPa. For saving the reaction time, it is preferred that the pressure is in the range of from 0.2 to 2 kPa.

The lower the pressure for the reaction (namely, the higher the degree of vacuum), the higher the facility in removal of eliminated diols (I) and (II) from the reaction system, and hence the higher the rate of the reaction. However, for increasing the degree of vacuum, use of a higher performance vacuum pump is required. Use of such vacuum pump poses problems in that such vacuum pump is not easily available, and that, even when such vacuum pump is available, the equipment cost becomes high.

If desired, the polymerization reaction and the self-condensation reaction can be performed in the presence of a catalyst. The catalyst can be appropriately selected from the catalysts conventionally used for a transesterification.

Examples of such catalysts include metals, such as lithium, sodium, potassium, rubidium, cesium, magnesium, calcium, strontium, barium, zinc, aluminum, titanium, cobalt, germanium, tin, lead, antimony, arsenic and cerium, and compounds thereof. Examples of metal compounds include salts, alkoxides and organometal compounds. Among these, especially preferred are titanium compounds, such as titanium tetrabutoxide, titanium tetra-n-propoxide and titanium tetra-isopropoxide; tin compounds, such as dibutyltin oxide, tin oxalate, dibutyltin dimaleate and dibutyltin dilaurate; and lead compounds, such as tetraphenyllead, lead acetate and lead stearate.

The amount of catalyst is generally in the range of from 0.00001 to 1% by weight, based on the total weight of the raw materials charged into the reactor.

In the case where the copolycarbonate diol of the present invention is used as a material for producing a thermoplastic elastomer, especially a polyester polycarbonate elastomer, when a residue of the catalyst is present in the copolycarbonate diol, there is a problem in that a transesterification occurs between the hard segment (i.e., polyester), and the soft segment (i.e., polycarbonate diol) due to the presence of the residual catalyst, leading to a deterioration of the properties of the thermoplastic elastomer obtained. For preventing the occurrence of such problem, it is preferred that the polymerization is performed without using a catalyst. On the other hand, when the polymerization is performed in the presence of a catalyst, it is required that, prior to the use of the copolycarbonate diol as a material for producing a thermoplastic elastomer, the copolycarbonate diol be purified so as to remove the residual catalyst and to prevent the occurrence of the deterioration of the properties of the thermoplastic elastomer derived therefrom. From the viewpoint of reducing the work load of the purification operation, when the polymerization reaction is performed in the presence of a catalyst, it is preferred that the catalyst is used in an amount in the range of from 0.00001 to 0.0001% by weight, based on the total weight of the raw materials charged into the reactor.

The thus obtained copolycarbonate diol of the present invention and a polyisocyanate are subjected to copolymerization, to thereby obtain the thermoplastic polyurethane of the present invention. The thermoplastic polyurethane of the present invention exhibits excellent properties with respect to flexibility, heat resistance, low temperature properties, weathering resistance, strength, and molding processability. Therefore, the thermoplastic polyurethane of the present invention is extremely useful as a material for producing various shaped articles. Hereinbelow, an explanation is made of the thermoplastic polyurethane of the present invention.

Examples of polyisocyanates used for producing the thermoplastic polyurethane of the present invention include conventional aromatic diisocyanates, such as 2,4-tolylene diisocyanate, 2,6-tolylene diisocyanate, a mixture of 2,4-tolylene diisocyanate and 2,6-tolylene diisocyanate (TDI), diphenylmethane-4,4'-diisocyanate (MDI), naphthalene-1,5-diisocyanate (NDI), 3,3'-dimethyl-4,4'-biphenylene diisocyanate, crude TDI, polymethylenepolyphenyl isocyanate, crude MDI, xylylene diisocyanate (XDI) and phenylene diisocyanate; conventional aliphatic diisocyanates, such as 4,4'-methylenebiscyclohexyl diisocyanate (hydrogenated MDI), hexamethylene diisocyanate (HMDI), isophorone diisocyanate (IPDI) and cyclohexane diisocyanate (hydrogenated XDI); and modified products thereof, such as isocyanurate products, carbodimide products and biuret products.

In the present invention, if desired, a chain extender may be used as a copolymerizable component. As the chain extender, there may be employed a customary chain extender used for producing a polyurethane, as described in, for example, "Saishin Poriuretan Oyo-Gijutsu (Latest Application Techniques of Polyurethane)" edited by Keiji Iwata, pp. 25–27, CMC, Japan, 1985. Examples of chain extenders include water, a low molecular weight polyol, a polyamine and the like. Depending on the use of the thermoplastic polyurethane, if desired, a conventional high molecular weight polyol may also be used in combination with the copolycarbonate diol of the present invention as long as the properties of the produced polyurethane are not adversely affected. As the conventional high molecular weight polyol, there may be employed those which are described in, for example, pp. 12–23 of "Poriuretan Foumu (Polyurethane Foam)" by Yoshio Imai, published by Kobunshi Kankokai, Japan, 1987. Examples of high molecular weight polyols include a polyester polyol and a polyether carbonate having a polyoxyalkylene chain (i.e., a polyether carbonate polyol).

Specifically, a low molecular weight polyol used as a chain extender is generally a diol monomer having a molecular weight of not more than 300. Examples of such low molecular weight polyols include aliphatic diols, such as ethylene glycol, 1,3-propanediol, 1,4-butanediol, 1,5-pentanediol, 1,6-hexanediol, neopentyl glycol and 1,10-decanediol.

Further examples of low molecular weight polyols used as a chain extender include alicyclic diols, such as 1,1-cyclohexanedimethanol, 1,4-cyclohexanedimethanol and tricyclodecanedimethanol; xylylene glycol, bis(p-hydroxy) diphenyl, bis(p-hydroxyphenyl)propane, 2,2-bis[4-(2-hydroxyethoxy)phenyl]propane, bis[4(2-hydroxy) phenyl] sulfone and 1,1-bis[4-(2-hydroxyethoxy)phenyl] cyclohexane. As a chain extender, ethylene glycol and 1,4-butanediol are preferred.

For producing the thermoplastic polyurethane of the present invention, a urethane-forming technique known in the art may be employed. For example, the copolycarbonate diol of the present invention is reacted with an organic polyisocyanate under atmospheric pressure at a temperature of from room temperature to 200° C. to form a thermoplastic polyurethane. When a chain extender is optionally used, a chain extender may be added to the reaction system either before initiating the reaction or during the reaction. For a specific method for producing a thermoplastic polyurethane, reference can be made to U.S. Pat. No. 5,070,173.

In the polyurethane-forming reaction, a conventional polymerization catalyst, such as a tertiary amine and an organic salt of a metal, e.g., tin or titanium, may be employed (see, for example, "Poriuretan Jushi (Polyurethane Resin)" written by Keiji Iwata, pages 23 to 32, published in 1969 by The Nikkan Kogyo Shimbun, Ltd., Japan). The polyurethane-forming reaction may be performed in a solvent. Preferred examples of solvents include dimethylformamide, diethylformamide, dimethylacetamide, dimethylsulfoxide, tetrahydrofuran, methyl isobutyl ketone, dioxane, cyclohexanone, benzene, toluene and ethyl cellosolve.

In the polyurethane-forming reaction, a compound having only one active hydrogen atom which is capable of reacting with an isocyanate group, for example, a monohydric alcohol, such as ethyl alcohol or propyl alcohol, and a secondary amine, such as diethylamine or di-n-propylamine, may be used as a reaction terminator.

In the present invention, it is preferred that stabilizers, such as heat stabilizers (for example, antioxidants) and light stabilizers, are added to the thermoplastic polyurethane.

Examples of antioxidants (heat stabilizers) include aliphatic, aromatic or alkyl-substituted aromatic esters of phosphoric acid or phosphorous acid; hypophosphinic acid derivatives; phosphorus-containing compounds, such as phenylphosphonic acid, phenylphosphinic acid, diphenylphosphonic acid, polyphosphonate, dialkylpentaerythritol diphosphite and a dialkylbisphenol A diphosphite; phenol derivatives, especially, hindered phenol compounds; sulfur-containing compounds, such as thioether type compounds, dithioacid salt type compounds, mercaptobenzimidazole type compounds, thiocarbanilide type compounds and thiodipropionic acid esters; and tin-containing compounds, such as tin malate and dibutyltin monooxide.

In general, antioxidants can be classified into primary, secondary and tertiary antioxidants. As hindered phenol compounds used as a primary antioxidant, Irganox 1010 (trade name) (manufactured and sold by CIBA-GEIGY, Switzerland) and Irganox 1520 (trade name) (manufactured and sold by CIBA-GEIGY, Switzerland) are preferred. As phosphorus-containing compounds used as a secondary antioxidant, PEP-36, PEP-24G and HP-10 (each being a trade name) (each manufactured and sold by ASAHI DENKA K.K., Japan) and Irgafos 168 (trade name) (manufactured and sold by CIBA-GEIGY, Switzerland) are preferred. Further, as sulfur-containing compounds used as a tertiary antioxidant, thioether compounds, such as dilaurylthiopropionate (DLTP) and distearylthiopropionate (DSTP) are preferred.

Examples of light stabilizers include UV absorber type light stabilizers and radical scavenger type light stabilizers. Specific examples of UV absorber type light stabilizers include benzotriazole compounds and benzophenone compounds. Specific examples of radical scavenger type light stabilizers include hindered amine compounds.

The above-exemplified stabilizers can be used individually or in combination. The stabilizers are added to the thermoplastic polyurethane in an amount of from 0.01 to 5 parts by weight, preferably from 0.1 to 3 parts by weight, more preferably from 0.2 to 2 parts by weight, relative to 100 parts by weight of the thermoplastic polyurethane.

If desired, a plasticizer may be added to the thermoplastic polyurethane of the present invention. Examples of plasticizers include phthalic esters, such as dioctyl phthalate, dibutyl phthalate, diethyl phthalate, butylbenzyl phthalate, di-2-ethylhexyl phthalate, diisodecyl phthalate, diundecyl phthalate and diisononyl phthalate; phosphoric esters, such as tricresyl phosphate, triethyl phosphate, tributyl phosphate, tri-2-ethylhexyl phosphate, trimethylhexyl phosphate, tris-chloroethyl phosphate and tris-dichloropropyl phosphate; aliphatic esters, such as octyl trimellitate, isodecyl trimellitate, trimellitic esters, dipentaerythritol esters, dioctyl adipate, dimethyl adipate, di-2-ethylhexyl azelate, dioctyl azelate, dioctyl sebacate, di-2-ethylhexyl sebacate and methylacetyl ricinoleate; pyromellitic esters, such as octyl pyromellitate; epoxy plasticizers, such as epoxidized soyabean oil, epoxidized linseed oil and epoxidized fatty acid alkyl esters; polyether plasticizers, such as adipic ether ester and polyether; liquid rubbers, such as liquid NBR, liquid acrylic rubber and liquid polybutadiene; and non-aromatic paraffin oil.

The above-exemplified plasticizers may be used individually or in combination. The amount of the plasticizer added to the thermoplastic polyurethane is appropriately chosen in accordance with the required hardness and properties of the thermoplastic polyurethane; however, in general, it is preferred that the plasticizer is used in an amount of from 0.1 to 50 parts by weight, relative to 100 parts by weight of the thermoplastic polyurethane.

In addition, other additives, such as inorganic fillers, lubricants, colorants, silicon oil, foaming agents, flame retardants and the like, may be added to the thermoplastic polyurethane of the present invention. Examples of inorganic fillers include calcium carbonate, talc, magnesium hydroxide, mica, barium sulfate, silicic acid (white carbon), titanium oxide and carbon black. These additives may be added to the thermoplastic polyurethane of the present invention in an amount which is generally used for the conventional thermoplastic polyurethane.

The Shore D hardness of the thermoplastic polyurethane of the present invention is preferably in the range of from 20 to 70, more preferably from 25 to 50. When the Shore D hardness is less than 20, heat stability and scratch resistance become low. On the other hand, when the Shore D hardness is more than 70, low temperature properties and softness become unsatisfactory.

Further, the melt flow rate (as measured at 230° C. under a load of 2.16 kg; hereinafter, abbreviated to "MFR") of the thermoplastic polyurethane of the present invention is preferably from 0.5 to 100 g/10 minutes, more preferably from 5 to 50 g/10 minutes, still more preferably from 10 to 30 g/10 minutes. When MFR is less than 0.5 g/10 minutes, the injection moldability of the thermoplastic polyurethane becomes poor and the injection molding is likely to result in "incomplete filling" (that is, the filling of the mold cavity becomes incomplete). On the other hand, when MFR is more than 100 g/10 minutes, not only the mechanical properties (such as tensile strength and elongation at break) and abrasion resistance, but also low temperature properties are lowered.

With respect to the molecular weight of the thermoplastic polyurethane of the present invention, it is preferred that each of the number average molecular weight (Mn) and weight average molecular weight (Mw) of the thermoplastic polyurethane is in the range of from 10,000 to 200,000. Each of Mn and Mw is measured by GPC analysis, using a calibration curve obtained with respect to standard polystyrene samples.

The thus obtained thermoplastic polyurethane of the present invention exhibits excellent properties with respect to flexibility, heat resistance, low temperature properties, weathering resistance, strength, and molding processability. Therefore, the thermoplastic polyurethane of the present invention is extremely useful as a material for producing various shaped articles, such as automobile parts, parts for household electric appliances, toys and sundry goods. Especially, the thermoplastic polyurethane of the present invention is useful for producing shaped articles which are required to have high strength, such as hoses, sheets and industrial belts; and shaped articles which are required to have high flexibility, such as interior and exterior parts for automobiles (for example, window moles, bumpers, skin parts for an instrument panel, and grips), spandexes, bands for wristwatches, and shoe soles.

BEST MODE FOR CARRYING OUT THE INVENTION

Hereinbelow, the present invention will be described in more detail with reference to the following Examples and Comparative Examples; however, they should not be construed as limiting the scope of the present invention.

In the following Examples and Comparative Examples, various measurements and analyses were performed by the following methods.

(1) Number Average Molecular Weight (Mn) of Polycarbonate Diol

The acid values of the polycarbonate diols obtained in Examples and Comparative Examples were measured (wherein the acid value is defined as the amount (mg) of potassium hydroxide (KOH) required for neutralizing the acidic groups in 1 g of a polycarbonate diol). As a result, it was found that none of the polycarbonate diols had an acid value exceeding 0.01.

The polycarbonate diols were examined by $^{13}$C-NMR spectroscopy (nuclear magnetic resonance measurement apparatus: α-400; manufactured and sold by JEOL LTD., Japan) (observation frequency: 100 MHz, accumulation number: 10,000, and measuring temperature: 20° C.). In the $^{13}$C-NMR spectra of the polycarbonate diols, no signal ascribed to an acid group, such as a carboxyl group, was observed.

From the results of the measurements, it was found that the polycarbonate diols contained substantially no acid groups, that is, substantially all terminal groups of the polycarbonate diols were hydroxyl groups.

Thus, it was found that the number average molecular weights (Mn) of the polycarbonate diols were able to be calculated from the hydroxyl values of the polycarbonate diols (wherein the hydroxyl value can be measured by the method as shown in item (2) below). Therefore, the number average molecular weight (Mn) of each polycarbonate diol was calculated from the hydroxyl value (mg-KOH/g) thereof in accordance with the following formula:

$$Mn = (2 \times 56.11 \times 1{,}000) \div \text{hydroxyl value}$$

(2) Hydroxyl Value of Polycarbonate Diol

An acetylation reagent was prepared by adding pyridine to 12.5 g of acetic anhydride so that the total volume became 50 ml.

2.5 to 5.0 g of a polycarbonate diol obtained was precisely weighed out and placed in a 100 ml eggplant-shaped flask. 5 ml of the acetylation reagent prepared above and 10 ml of toluene were put into the eggplant-shaped flask by means of a transfer pipette, and the resultant mixture in the eggplant-shaped flask was then heated at 100° C. for 1 hour while stirring to thereby obtain a reaction mixture.

2.5 ml of distilled water was put into the eggplant-shaped flask containing the obtained reaction mixture by means of a transfer pipette, and the resultant mixture in the eggplant-shaped flask was further stirred for 10 minutes, followed by cooling for a few minutes. 12.5 ml of ethanol and a few drops of a phenolphthalein solution as an indicator were added to the mixture in the eggplant-shaped flask to obtain a solution. The obtained solution was titrated with a 0.5 mol/l potassium hydroxide solution in ethanol.

On the other hand, a blank test was performed by repeating substantially the same procedure as mentioned above, except that a polycarbonate diol was not used.

Then, based on the results of these operations, the hydroxyl value of the polycarbonate diol was calculated in accordance with the following formula:

$$\text{Hydroxyl value (mg-KOH/g)} = ((B-A) \times 28.5 \times f)/C$$

wherein:

A represents the amount (ml) of the ethanol solution of potassium hydroxide used for the titration;

B represents the amount (ml) of the ethanol solution of potassium hydroxide used for the titration performed in the blank test;

C represents the weight (g) of the polycarbonate diol; and f represents the factor of the ethanol solution of potassium hydroxide.

Hereinafter, the hydroxyl value is referred to as the "OH value".

(3) Composition of the Recurring Units of Polycarbonate Diol 1 g of a copolycarbonate diol was weighed out and placed in a 100 ml eggplant-shaped flask. 30 g of ethanol and 4 g of potassium hydroxide were added to the copolycarbonate diol in the eggplant-shaped flask, and a reaction was performed at 100° C. for 1 hour, thereby obtaining a reaction mixture.

The obtained reaction mixture was cooled to room temperature, and a few drops of a phenolphthalein solution as an indicator were added to the reaction mixture, followed by neutralization using hydrochloric acid, to obtain a mixture. The obtained mixture was cooled in a refrigerator for 1 hour to thereby precipitate a salt (potassium chloride) formed by neutralization. The precipitated potassium chloride was removed by filtration and the resultant filtrate was analyzed by gas chromatography to thereby determine the amounts (mol) of 1,3-propanediol, 1,4-butanediol, 1,5-pentanediol and 1,6-hexanediol which were contained in the filtrate.

The composition of recurring units was evaluated as the ratio (mol %) of recurring units derived from 1,3-propanediol, based on the total molar amount of recurring units derived from the above-mentioned diols. The composition of recurring units of the polycarbonate diol was calculated in accordance with the following formula:

$$\text{Composition of recurring units (mol \%)} = (D/E) \times 100$$

wherein:

D represents the molar amount of 1,3-propanediol; and

E represents the total molar amount of the above-mentioned diols.

With respect to the copolycarbonate diol obtained in Comparative Example 3 (wherein the copolycarbonate diol contained no recurring units derived from 1,3-propanediol), the composition of recurring units was evaluated as the ratio (mol %) of recurring units derived from 1,5-pentanediol, based on the total molar amount of recurring units derived from 1,5-pentanediol and 1,6-hexanediol. That is, the composition of recurring units of the copolycarbonate diol obtained in Comparative Example 3 was determined in substantially the same manner as mentioned above, except that, in the above-mentioned formula, D represents the molar amount of 1,5-pentanediol and E represents the total molar amount of 1,5-pentanediol and 1,6-hexanediol.

Conditions for gas chromatography were as follows.

| Apparatus: | GC-14B (manufactured and sold by Shimadzu Corporation, Japan) |
|---|---|
| Column: | DB-WAX (manufactured and sold by J & W, U.S.A.) (column length: 30 m; film thickness: 0.25 μm) |
| Detector: | FID (flame ionization detector) |
| Internal standard: | diethylene glycol diethyl ether |
| Temperature: | the temperature was first maintained at 60° C. for 5 minutes and then elevated to 250° C. at a rate of 10° C./min. |

(4) Viscosity of Polycarbonate Diol

The viscosity was measured at 50° C. in accordance with ASTM, D1986, p.193 to 194, using the digital Brookfield viscometer LVTDV-1 (manufactured and sold by BROOKFIELD ENGINEERING LABORATORIES INC., U.S.A.) (wherein the spindle (rotor) No. 34 was used).

(5) Melting Temperature (Tm) and Glass Transition Temperature (Tg) of Polycarbonate Diol About 10 mg of a polycarbonate diol was precisely weighed out and placed in an aluminum pan and subjected to measurement using a differential scanning calorimeter, in order to determine the melting temperature and glass transition temperature of the polycarbonate diol under the following analysis conditions:

| Apparatus: | DSC220C (manufactured and sold by Seiko Instruments Inc, Japan) |
|---|---|
| Temperature range of measurement: | −120 to 70° C. |
| Temperature elevation rate: | 10° C./min. |

(6) Number Average Molecular Weight and Weight Average Molecular Weight of Thermoplastic Polyurethane The number average molecular weight and weight average molecular weight of a thermoplastic polyurethane were measured by gel permeation chromatography (GPC) using a calibration curve obtained with respect to standard monodisperse polystyrene samples.

(7) Various Mechanical Properties of Thermoplastic Polyurethane

Measurements were performed as follows.

(i) Shore 'D' Hardness [−]:

Shore 'D' hardness was measured in accordance with ASTM D2240, D type, at 23° C.

(ii) Tensile Stress [kgf/cm$^2$]:

Tensile stress was measured in accordance with JIS K6251 (using a dumbbell No. 3 prescribed therein). A pressed sheet having a thickness of 2 mm was used as a test sample.

(iii) Tensile Strength at 100% Elongation [kgf/cm$^2$]:

Tensile strength was measured in accordance with JIS K6251 (using a dumbbell No. 3 prescribed therein). A pressed sheet having a thickness of 2 mm was used as a test sample.

(iv) Elongation [%]:

Elongation was measured in accordance with JIS K6251 (using a dumbbell No. 3 prescribed therein). A pressed sheet having a thickness of 2 mm was used as a test sample.

(v) Impact Resilience [%]:

Impact resilience was measured in accordance with JIS K6255 (using a Lübke pendulum, 23° C.).

EXAMPLE 1

305 g of 1,3-propanediol, 355 g of 1,6-hexanediol and 760 g of ethylene carbonate were charged into a 2-liter separable flask equipped with a stirrer, a thermometer and an Oldershaw distillation column having a vacuum jacket and having a reflux head at the top thereof. The resultant mixture in the separable flask was stirred at 70° C. to obtain a solution. To the obtained solution was added 0.015 g of lead acetate trihydrate as a catalyst, to obtain a mixture.

The flask was connected to a vacuum pump, and the mixture in the flask was subjected to a polymerization reaction for 12 hours while stirring under conditions wherein the degree of vacuum was from 1.0 to 1.5 kPa and the internal temperature of the flask was 140° C. (wherein the flask was heated in an oil bath having a temperature of 175° C.), to obtain a reaction mixture. During the reaction, a portion of the distillate was withdrawn through the reflux head so that the reflux ratio became 4.

Then, the Oldershaw distillation column was removed from the separable flask, and a condenser and a receiver were attached to the separable flask to thereby form a vacuum distillation apparatus. Under a vacuum of 0.5 kPa, the separable flask was heated in an oil bath (the bath temperature: 180° C.) so that the internal temperature of the separable flask was elevated to a temperature in the range of from 140 to 150° C., to thereby distill off 1,3-propanediol, 1,6-hexanediol, ethylene glycol (which was derived from ethylene carbonate) and ethylene carbonate which were contained in the reaction mixture in the flask.

Thereafter, the temperature of the oil bath was elevated to 185° C. while maintaining the degree of vacuum in the flask at 0.5 kPa, thereby elevating the internal temperature of the separable flask to a temperature in the range of from 160 to 165° C., and the heating was continued for 4 hours to effect a reaction while distilling off 1,3-propanediol and 1,6-hexanediol which were by-produced during the reaction.

As a result, 721 g of a copolycarbonate diol was obtained. The obtained copolycarbonate diol is hereinafter referred to as "pc-a". The copolycarbonate diol pc-a was a viscous liquid at room temperature.

The properties of pc-a, i.e., OH value, number average molecular weight, recurring unit composition (composition, mol %), melting temperature, glass transition temperature and viscosity, are shown in Table 1.

EXAMPLE 2

228 g of 1,3-propanediol, 270 g of 1,4-butanediol and 530 g of ethylene carbonate were charged into a 2-liter separable flask equipped with a stirrer, a thermometer and an Oldershaw distillation column having a vacuum jacket and having a reflux head at the top thereof. The resultant mixture in the separable flask was stirred at 70° C. to obtain a solution. To the obtained solution was added 0.014 g of lead acetate trihydrate as a catalyst, to obtain a mixture.

The flask was connected to a vacuum pump, and the mixture in the flask was subjected to a polymerization reaction for 20 hours while stirring under conditions wherein the degree of vacuum was from 1.0 to 1.5 kPa and the internal temperature of the flask was 130° C. (wherein the flask was heated in an oil bath having a temperature of 170° C.), to obtain a reaction mixture. During the reaction, a portion of the distillate was withdrawn through the reflux head so that the reflux ratio became 4.

Then, the Oldershaw distillation column was removed from the separable flask, and a condenser and a receiver were attached to the separable flask to thereby form a vacuum distillation apparatus. Under a vacuum of 0.5 kPa, the separable flask was heated for 4 hours in an oil bath (the bath temperature: 170° C.) so that the internal temperature of the separable flask was maintained at a temperature in the range of from 130 to 140° C., to thereby effect a reaction. During the reaction, 1,3-propanediol, 1,4-butanediol, ethylene glycol (which was derived from ethylene carbonate) and ethylene carbonate which were contained in the reaction mixture in the flask, were distilled off.

As a result, 514 g of a copolycarbonate diol was obtained. The obtained copolycarbonate diol is hereinafter referred to as "pc-b". The copolycarbonate diol pc-b was a viscous liquid at room temperature.

The properties of pc-b, i.e., OH value, number average molecular weight, recurring unit composition (composition, mol %), melting temperature, glass transition temperature and viscosity, are shown in Table 1.

COMPARATIVE EXAMPLE 1

Substantially the same procedure as in Example 1 was repeated except that the amounts of 1,3-propanediol, ethylene carbonate and lead acetate trihydrate were changed to 420 g, 440 g and 0.010 g, respectively, and that 1,6-hexanediol was not used, to thereby obtain 364 g of a polycarbonate diol. Hereinafter, the thus produced polycarbonate diol is referred to as "pc-c". The polycarbonate diol pc-c was a viscous liquid at room temperature.

The properties of pc-c, i.e., OH value, number average molecular weight, recurring unit composition (composition, mol %), melting temperature, glass transition temperature and viscosity, are shown in Table 1.

COMPARATIVE EXAMPLE 2

472 g of 1,6-hexanediol and 344 g of ethylene carbonate were charged into a 2-liter separable flask equipped with a stirrer, a thermometer and an Oldershaw distillation column having a vacuum jacket and having a reflux head at the top thereof. The resultant mixture in the separable flask was stirred at 70° C. to obtain a solution. To the obtained solution was added 0.010 g of lead acetate trihydrate as a catalyst, to obtain a mixture.

The flask was connected to a vacuum pump, and the mixture in the flask was subjected to a polymerization reaction for 8 hours while stirring under conditions wherein the degree of vacuum was from 3.0 to 4.2 kPa and the internal temperature of the flask was 160° C. (wherein the flask was heated in an oil bath having a temperature of 190° C.), to obtain a reaction mixture. During the reaction, a portion of the distillate was withdrawn through the reflux head so that the reflux ratio became 4.

Then, the Oldershaw distillation column was removed from the separable flask, and a condenser and a receiver were attached to the separable flask to thereby form a vacuum distillation apparatus. Under a vacuum of 0.5 kPa, the separable flask was heated in an oil bath (the bath temperature: 190° C.) so that the internal temperature of the separable flask was elevated to a temperature in the range of from 160 to 170° C., to thereby distill off unreacted diols and ethylene carbonate which were contained in the reaction mixture in the flask.

Thereafter, the temperature of the oil bath was elevated to 200° C. while maintaining the degree of vacuum in the flask at 0.5 kPa, thereby elevating the internal temperature of the separable flask to a temperature in the range of from 170 to 190° C., and the heating was continued for 3 hours to effect a reaction while distilling off a diol which was formed during the reaction.

As a result, 457 g of a polycarbonate diol was obtained. The obtained polycarbonate diol is hereinafter referred to as "pc-d". The polycarbonate diol pc-d was a white solid at room temperature.

The properties of pc-d, i.e., OH value, number average molecular weight, recurring unit composition (composition, mol %), melting temperature, glass transition temperature and viscosity, are shown in Table 1.

COMPARATIVE EXAMPLE 3

Substantially the same procedure as in Comparative Example 2 was repeated except that the amounts of 1,6-hexanediol, ethylene carbonate and lead acetate trihydrate were changed to 325 g, 485 g and 0.015 g, respectively, and that 285 g of 1,5-pentanediol was used, to thereby obtain 385 g of a copolycarbonate diol. Hereinafter, the thus produced copolycarbonate diol is referred to as "pc-e". The copolycarbonate diol pc-e was a viscous liquid at room temperature.

The properties of pc-e, i.e., OH value, number average molecular weight, recurring unit composition (composition, mol %), melting temperature, glass transition temperature and viscosity, are shown in Table 1.

TABLE 1

|  | OH value | Mn | Composition (mol %) | Melting temperature (° C.) | Glass transition temperature (° C.) | Viscosity (cp) | Abbreviation |
|---|---|---|---|---|---|---|---|
| Ex. 1 | 61 | 1840 | 36 | — | −53 | 5340 | pc-a |
| Ex. 2 | 69 | 1630 | 34 | — | −54 | 4890 | pc-b |
| Comp. Ex. 1 | 186 | 600 | 100 | — | −54 | 887 | pc-c |
| Comp. Ex. 2 | 52 | 2160 | — | 41 | −51 | 15200 | pc-d |
| Comp. Ex. 3 | 56 | 2000 | 49[1)] | — | −54 | 7400 | pc-e |

[1)]The ratio (mol %) of recurring units derived from 1,5-pentanediol, based on the total molar amount of recurring units derived from 1,5-pentanediol and 1,6-hexanediol.

EXAMPLE 3

200 g of pc-a obtained in Example 1 and 80.3 g of diphenylmethane-4,4'-diisocyanate (MDI) were charged into a reaction vessel equipped with a stirrer, a thermometer and a condenser. A reaction of the resultant mixture was performed at 100° C. for 4 hours, thereby obtaining a prepolymer having terminal NCO groups. To the obtained prepolymer were added 30 g of 1,4-butanediol as a chain extender and 0.006 g of dibutyltin dilaurylate as a catalyst. The resultant mixture was reacted at 140° C. for 60 minutes in a universal laboratory scale extruder (Universal Laboratory Scale Extruder KR-35 type; manufactured and sold by Kasamatsu Plastic Engineering and Research Co., Ltd., Japan) equipped with a kneader, thereby obtaining a thermoplastic polyurethane. The obtained thermoplastic polyurethane was then pelletized using the extruder.

The number average molecular weight (Mn) and weight average molecular weight (Mw) of the thermoplastic polyurethane were 73,000 and 126,000, respectively, as measured by GPC analysis, using a calibration curve obtained with respect to standard polystyrene samples. The properties of the thermoplastic polyurethane are shown in Table 2.

EXAMPLE 4

A thermoplastic polyurethane was produced in substantially the same manner as in Example 3 except that pc-b obtained in Example 2 was used as a copolycarbonate diol, instead of pc-a. The molecular weight and properties of the thermoplastic polyurethane are shown in Table 2.

EXAMPLE 5

A thermoplastic polyurethane was produced in substantially the same manner as in Example 3 except that the amounts of MDI and 1,4-butanediol were changed to 24.5 g and 4.16 g, respectively. The molecular weight and properties of the thermoplastic polyurethane are shown in Table 2.

TABLE 2

| Properties of polyurethane | Ex. 3 | Ex. 4 | Ex. 5 |
|---|---|---|---|
| Polycarbonate diol | pc-a | pc-b | pc-a |
| Number average molecular weight (×10$^4$ Mn) | 7.3 | 6.9 | 6.6 |
| Weight average molecular weight (×10$^4$ Mw) | 12.6 | 12.8 | 14.2 |
| Properties |  |  |  |
| Hardness (shore D) | 43 | 44 | 26 |
| 100% tensile stress (kgf/cm$^2$) | 36 | 38 | 26 |
| Tensile strength (kgf/cm$^2$) | 180 | 200 | 130 |
| Elongation (%) | 500 | 480 | 660 |
| Impact resilience (%) | 58 | 53 | 62 |

COMPARATIVE EXAMPLES 4, 5 and 6

Thermoplastic polyurethanes were individually produced in substantially the same manner as in Example 3 except that pc-c, pc-d and pc-e were used in Comparative Examples 4, 5, and 6, respectively, instead of pc-a. The molecular weight and properties of each of the thermoplastic polyurethanes are shown in Table 3.

TABLE 3

|  | Comp. Ex. 4 | Comp. Ex. 5 | Comp. Ex. 6 |
|---|---|---|---|
| Polycarbonate diol | pc-c | pc-d | pc-e |
| Number average molecular weight (×10$^4$ Mn) | 7.1 | 7.5 | 6.9 |
| Weight average molecular weight (×10$^4$ Mw) | 13.2 | 13.8 | 12.3 |
| Properties |  |  |  |
| Hardness (shore D) | 60 | 53 | 46 |
| 100% tensile stress (kgf/cm$^2$) | 63 | 58 | 46 |
| Tensile strength (kgf/cm$^2$) | 220 | 210 | 200 |
| Elongation (%) | 400 | 440 | 450 |
| Impact resilience (%) | 42 | 46 | 49 |

INDUSTRIAL APPLICABILITY

The copolycarbonate diol of the present invention is a liquid having low viscosity. Therefore, the copolycarbonate diol of the present invention is easy to handle, as compared to the conventional polycarbonate diols which are solids or highly viscous liquids. Hence, the copolycarbonate diol of the present invention is advantageous for various uses, such as a raw material for producing a thermoplastic elastomer (such as a thermoplastic polyurethane) used for producing various shaped articles (for example, a spandex, which is a polyurethane elastomeric fiber); a component for a coating material or an adhesive; and a polymeric plasticizer.

The thermoplastic polyurethane of the present invention exhibits excellent properties with respect to flexibility, heat resistance, low temperature properties, weathering resistance, strength, and molding processability. Therefore, the thermoplastic polyurethane of the present invention is extremely useful as a material for producing various shaped articles, such as automobile parts, parts for household electric appliances, toys and sundry goods. Especially, the thermoplastic polyurethane of the present invention is useful for producing shaped articles which are required to have high strength, such as hoses, sheets and industrial belts; and shaped articles which are required to have high flexibility, such as interior and exterior parts for automobiles (for example, window moles, bumpers, skin parts for an instrument panel, and grips), spandexes, bands for wristwatches, and shoe soles.

What is claimed is:

1. A copolycarbonate diol comprising:

(a) recurring units each represented by the following formula (1):

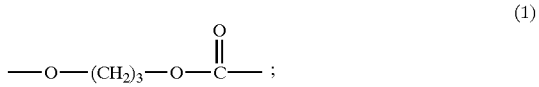

(b) recurring units each independently represented by the following formula (2):

wherein n is 4, 5 or 6; and (c) terminal hydroxyl groups,
   wherein said copolycarbonate diol has a number average molecular weight of from 300 to 20,000, and wherein the amount of said recurring units (a) is from 10 to 90% by mole, based on the total molar amount of said recurring units (a) and (b).

2. The copolycarbonate did according to claim 1, which has a number average molecular weight of from 500 to 10,000.

3. The copolycarbonate diol according to claim 1 or 2, wherein the amount of said recurring units (a) is from 20 to 80% by mole, based on the total molar amount of said recurring units (a) and (b).

4. A thermoplastic polyurethane obtained by copolymerizing the copolycarbonate diol claim 1 with a polyisocyanate.

* * * * *